US012703135B2

(12) United States Patent
Takahashi et al.

(10) Patent No.: US 12,703,135 B2
(45) Date of Patent: Aug. 11, 2026

(54) INJECTION MOLDING DEVICE

(71) Applicant: SEIKO EPSON CORPORATION, Tokyo (JP)

(72) Inventors: Masayuki Takahashi, Shiojiri (JP); Kakeru Sasagawa, Matsumoto (JP); Ippei Honma, Shonai (JP)

(73) Assignee: SEIKO EPSON CORPORATION (JP)

(*) Notice: Subject to any disclaimer, the term of this patent is extended or adjusted under 35 U.S.C. 154(b) by 95 days.

(21) Appl. No.: 18/813,513

(22) Filed: Aug. 23, 2024

(65) Prior Publication Data

US 2025/0065551 A1 Feb. 27, 2025

(30) Foreign Application Priority Data

Aug. 24, 2023 (JP) ................................ 2023-136120

(51) Int. Cl.
*B29C 45/76* (2006.01)
*B29C 45/17* (2006.01)
(Continued)

(52) U.S. Cl.
CPC ........ *B29C 45/762* (2013.01); *B29C 45/2708* (2013.01); *B29C 45/768* (2013.01);
(Continued)

(58) Field of Classification Search
CPC ..... B29C 45/53; B29C 45/541; B29C 45/542; B29C 45/72; B29C 2045/1785;
(Continued)

(56) References Cited

U.S. PATENT DOCUMENTS 3,622,050 A * 11/1971 Acton ..................... B29C 45/53 222/309
3,642,402 A * 2/1972 Hutchinson ............. B29C 45/76 425/543

(Continued)

FOREIGN PATENT DOCUMENTS

JP 2023-058863 A 4/2023
WO WO-2015004272 A1 * 1/2015 ......... B29C 49/6409
WO 2016-093265 A1 6/2016

*Primary Examiner* — Emmanuel S Luk
(74) *Attorney, Agent, or Firm* — Harness, Dickey & Pierce, P.L.C.

(57) ABSTRACT

An injection molding device includes a fixing section to which a molding die having a fixed molding die and a movable molding die, an injection section that injects a molding material, and a moving section that moves the injection section relative to the fixed molding die. The injection section includes a nozzle and an injection amount adjustment mechanism. The injection molding device further includes a control section configured to control the moving section, the injection amount adjustment mechanism, and a heater. The control section executes the following in a state where the molding die is mounted on the fixing section, a first control in which the nozzle is brought into contact with the fixed molding die and the molding material is injected, and a second control in which the nozzle is separated from the fixed molding die after a predetermined time elapses from the completion of the first control.

6 Claims, 9 Drawing Sheets

(51) Int. Cl.
*B29C 45/27* (2006.01)
*B29C 45/64* (2006.01)
*B29K 101/10* (2006.01)

(52) U.S. Cl.
CPC ................. *B29C 2045/1785* (2013.01); *B29C 2045/644* (2013.01); *B29C 2945/76006* (2013.01); *B29C 2945/76224* (2013.01); *B29C 2945/76658* (2013.01); *B29C 2945/76732* (2013.01); *B29K 2101/10* (2013.01)

(58) Field of Classification Search
CPC .... B29C 2045/644; B29C 2945/76224; B29C 2945/76658; B29C 2945/76732; B29C 45/762; B29C 45/768
See application file for complete search history.

(56) References Cited

U.S. PATENT DOCUMENTS 3,647,309 A * 3/1972 Thompson .............. B29C 45/76 425/150
3,710,987 A * 1/1973 Bessho ................... B29C 45/53 222/386
3,840,312 A * 10/1974 Paulson .................. B29C 45/77 264/328.13
4,540,541 A * 9/1985 Harding .............. B29C 45/2725 264/328.2
4,752,201 A * 6/1988 Kauffman ........... B29C 45/0005 425/170
4,783,298 A * 11/1988 Oda ...................... B29C 43/146 264/254
5,505,891 A * 4/1996 Shah ................... B29C 45/1706 264/572
5,902,534 A * 5/1999 Fujishiro ............. B29C 37/0028 264/328.8
5,942,168 A * 8/1999 Ichikawa ............ B29C 33/3807 264/40.1
6,183,235 B1 * 2/2001 Taniguchi ............. B29C 45/561 425/149
6,267,580 B1 * 7/2001 Leopold .................. B29C 45/18 425/557
6,589,039 B1 * 7/2003 Doughty ................. B29C 45/77 425/149
7,013,196 B2 * 3/2006 Magario ................. B29C 45/76 700/197
7,580,771 B2 * 8/2009 Quail ..................... B22D 17/32 700/197
8,425,216 B2 * 4/2013 Catoen ................... G06Q 30/04 425/169
9,044,890 B2 * 6/2015 Beau ................... B29C 44/0461
11,040,472 B2 * 6/2021 Lawless, III .......... B29C 45/766
2002/0001703 A1 * 1/2002 Funakoshi .............. B32B 27/08 428/294.7
2002/0084543 A1 * 7/2002 Buja ....................... B29C 45/76 425/170
2004/0208951 A1 * 10/2004 Bealer ..................... B29C 45/66 425/595
2008/0009576 A1 * 1/2008 Alexander ............... C08J 3/201 524/568
2012/0277900 A1 * 11/2012 Catoen .................... B29C 45/78 700/202
2014/0370139 A1 * 12/2014 Horiuchi ................. B29C 45/84 425/136
2015/0197049 A1 * 7/2015 Olaru .................. B29C 45/2735 277/300
2015/0273746 A1 * 10/2015 Koch .................. B29C 45/1603 425/130
2016/0041533 A1 * 2/2016 Ueda ........................ G05B 5/01 700/275
2018/0050475 A1 * 2/2018 Kara ..................... B29C 45/261
2021/0086424 A1 * 3/2021 Hakoda ............... B29C 45/7613
2022/0032519 A1 * 2/2022 Kodaira ................ B29C 31/042
2022/0168937 A1 * 6/2022 Fujioka ................. B29C 45/531
2022/0184869 A1 * 6/2022 Birchmeier ........... B29C 45/766
2022/0250300 A1 * 8/2022 Gram .................. B29C 48/0017
2023/0118860 A1 4/2023 Maruyama et al.
2024/0198570 A1 * 6/2024 Susa ..................... B29C 45/641
2025/0232082 A1 * 7/2025 Faulhaber ............... G06F 30/20

* cited by examiner

INJECTION MOLDING DEVICE

The present application is based on, and claims priority from JP Application Serial Number 2023-136120, filed Aug. 24, 2023, the disclosure of which is hereby incorporated by reference herein in its entirety.

BACKGROUND

1. Technical Field

The present disclosure relates to an injection molding device.

2. Related Art

WO16/093265 discloses a molding method having a filling step of filling a cavity with a thermosetting molding material from a nozzle, and a hardening step of hardening the filled molding material. For example, in the hardening step, the molding material is hardened by heating the molding material in a state where the nozzle is separated from the molding material feed port.

When the nozzle is separated from the molding die immediately after the molding material is injected into the cavity, the uncured molding material may adhere to the nozzle and form strings.

SUMMARY

According to a first aspect of the present disclosure, an injection molding device is provided.

This injection molding device includes a removable fixing section having a fixed molding die formed with a gate opening and a movable molding die configured for molding die clamping with the fixed molding die, a cavity being defined by the fixed molding die and the movable molding die; an injection section that injects a molding material containing a thermosetting material and a polymerization initiator that initiates a polymerization reaction of the thermosetting material; and a moving section that moves the injection section relative to the fixed molding die mounted on the fixing section; wherein the injection section includes a nozzle having a nozzle opening and that injects the molding material from the nozzle opening, and an injection amount adjustment mechanism that adjusts the injection amount of the molding material from the nozzle opening; at least one of the fixing section and the molding die includes a heater that heats the molding die, the injection molding device further includes a control section configured to control the moving section, the injection amount adjustment mechanism, and the heater, and in a state where the molding die is mounted on the fixing section, the control section that executes a first control of, in a state where the heater is controlled to heat the molding die, controlling the moving section to bring the nozzle into contact with the fixed molding die and controlling the injection amount adjustment mechanism to inject the molding material from the nozzle opening, through the gate opening, and into the cavity and a second control of, after the elapse of a predetermined time from completion of the first control, controlling the moving section to separate the nozzle from the fixed molding die.

DESCRIPTION OF EMBODIMENTS

A. First Embodiment

Figure 1:
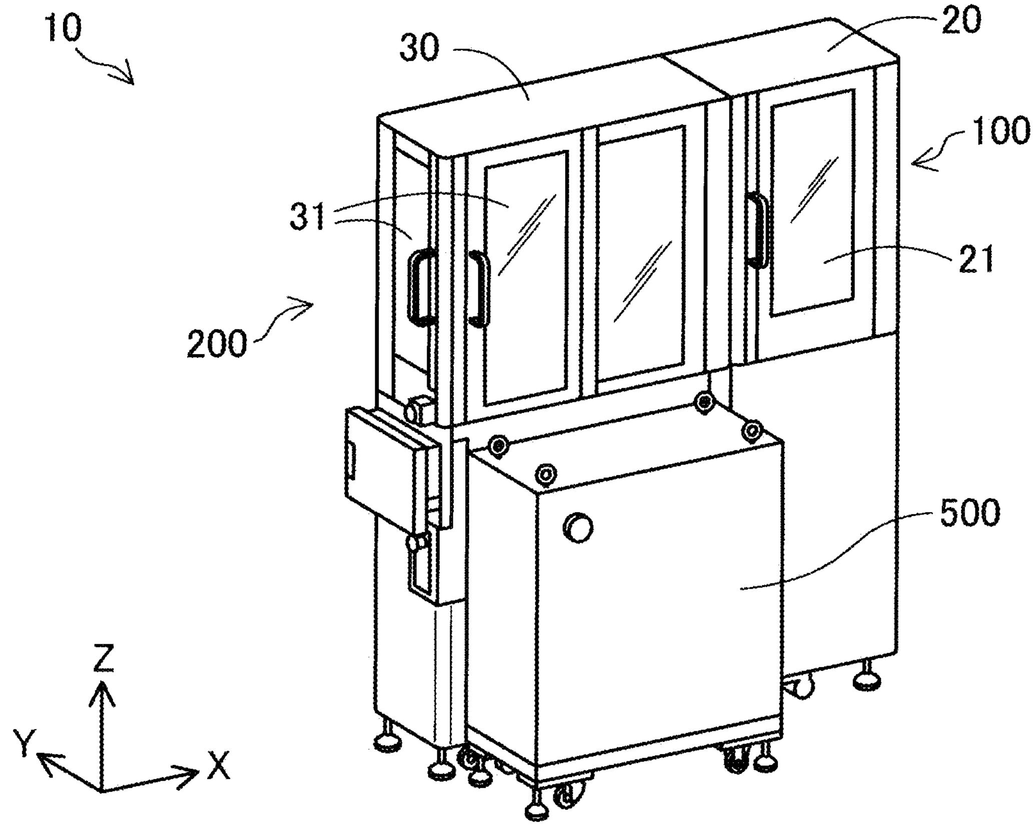
FIG. 1 is a perspective view of an injection molding device.

FIG. 1 is a perspective view of an injection molding device 10. In FIG. 1, arrows indicating X, Y, and Z directions orthogonal to each other are shown. The X direction and the Y direction are directions parallel to the horizontal plane. The Z direction is a direction parallel to the vertical direction. The X, Y, and Z directions in FIG. 1 and the X, Y, and Z directions in other figures indicate the same directions. When specifying the direction, the positive direction, which is the direction indicated by the arrow, is set to "+" and the negative direction, which is the direction opposite to the direction indicated by the arrow, is set to "−", and positive and negative signs are used in combination for direction notation. The +Z direction is also referred to as upward, and the −Z direction is also referred to as downward.

The injection molding device 10 molds a molded article by injecting a two liquid type thermosetting material into a molding die mounted on the injection molding device 10. The injection molding device 10 includes a pump unit 100, an injection unit 200, and a control section 500. The pump unit 100 is accommodated in a first housing 20 having a door 21. The injection unit 200 is accommodated in a second housing 30 having a door 31.

The control section 500 is configured by a computer including one or a plurality of processors, a memory, and an input/output interface that inputs and outputs signals to and from the outside. The control section 500 exhibits various functions such as a function of executing a process of molding a molded article by the processor executing a program or an instruction read on the main storage device. The control section 500 may be realized by a configuration in which a plurality of circuits for realizing at least a part of each function are combined, instead of being configured by a computer.

Figure 2:
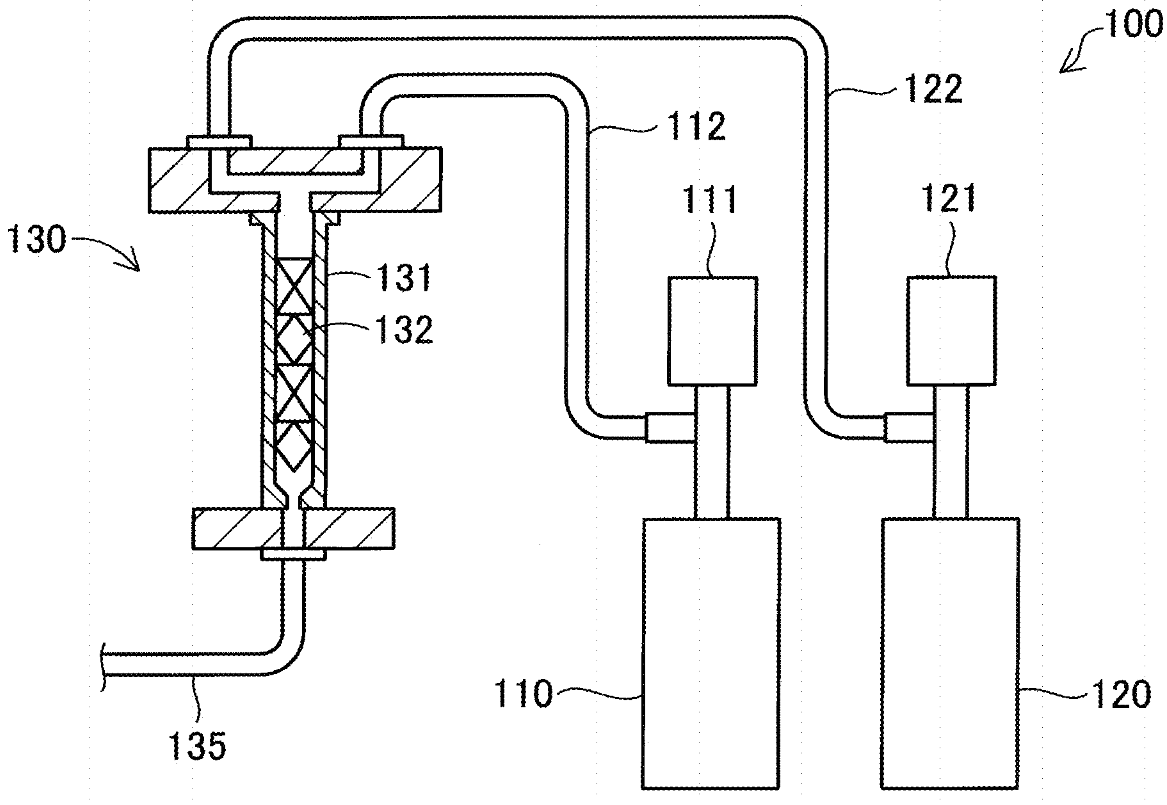
FIG. 2 is a view showing a schematic configuration of a pump unit.

FIG. 2 is a view showing a schematic configuration of the pump unit 100. The pump unit 100 mixes a main agent and a curing agent of a two liquid type thermosetting material and supplies the mixture to the injection unit 200. The pump unit 100 includes a first tank 110, a first pump 111, a second tank 120, a second pump 121, and a mixing section 130.

A first liquid is stored in the first tank 110. The first liquid contains a main agent of a two liquid type thermosetting material. The first liquid contains, for example, a silicone polymer which is a main agent of a two liquid type silicone rubber.

The first pump 111 is connected to the first tank 110. The first pump 111 pumps the first liquid stored in the first tank 110 to the mixing section 130. The first pump 111 is configured by, for example, a screw pump. The first pump 111 is driven under the control of the control section 500. The first liquid delivered from the first pump 111 is supplied to the mixing section 130 through a first pipe 112 connecting the first pump 111 and the mixing section 130. It is preferable that the first pump 111 can deliver the first liquid to the mixing section 130 in a fixed amount and can suppress a pulsating flow of the first liquid. The first pump 111 may be configured by a positive displacement pump other than a screw pump, such as a gear pump, or may be constituted by a turbo pump.

A second liquid is stored in the second tank 120. The second liquid contains a polymerization initiator that initiates a polymerization reaction of the two liquid type thermosetting material. By combining predetermined amounts of the first and second liquids, a polymerization reaction of the two liquid type thermosetting material can be initiated.

The second pump 121 is connected to the second tank 120. The second pump 121 pumps the second liquid stored in the second tank 120 to the mixing section 130. The second pump 121 is configured by, for example, a screw pump. The second pump 121 is driven under the control of the control section 500. The second liquid delivered from the second pump 121 is supplied to the mixing section 130 through a second pipe 122 connecting the second pump 121 and the mixing section 130. It is preferable that the second pump 121 can deliver the second liquid to the mixing section 130 in a fixed amount and can suppress a pulsating flow of the second liquid. The second pump 121 may be configured by a positive displacement pump other than a screw pump such as a gear pump, or may be configured by a turbo pump.

The mixing section 130 mixes the first liquid and the second liquid and supplies the mixed liquid to the injection unit 200. In the present embodiment, the mixing section 130 is configured as a static mixer. The mixing section 130 includes a mixing cylinder 131 and a stirring member 132 provided inside the mixing cylinder 131. The mixing section 130 may be configured as a dynamic mixer.

The mixing cylinder 131 is a cylindrical member. The stirring member 132 is configured by a plurality of mixing elements connected to each other. The plurality of mixing elements are arranged side by side from one end to the other end of the mixing cylinder 131. Each mixing element has a shape obtained by twisting a rectangular plate 180 degrees. The rotational direction of the torsion of the adjacent mixing elements are different from one another. Each mixing element is fixed to the inner wall surface of the mixing cylinder 131 and is stationary relative to the mixing cylinder 131. Although the stirring member 132 having four mixing elements is shown in FIG. 2, the number of mixing elements of the stirring member 132 may be two, three, or five or more.

The mixing section 130 mixes the first liquid and the second liquid flowing into the mixing cylinder 131 by the dividing effect, the changing effect, and the reversing effect from each mixing element of the stirring member 132. The dividing action is an action of dividing the flow of the fluid. The conversion action is an action of moving the fluid from the central axis of the mixing cylinder 131 toward the inner wall surface or from the inner wall surface toward the central axis. The reverse action is an action of reversing the direction of the vortex of the fluid flowing so as to draw a vortex around the central axis of the mixing cylinder 131. Hereinafter, the mixture of the first liquid and the second liquid is referred to as a molding material. The molding material generated in the mixing section 130 is supplied to the injection unit 200 through a third pipe 135 connecting the mixing section 130 and the injection unit 200.

Figure 3:
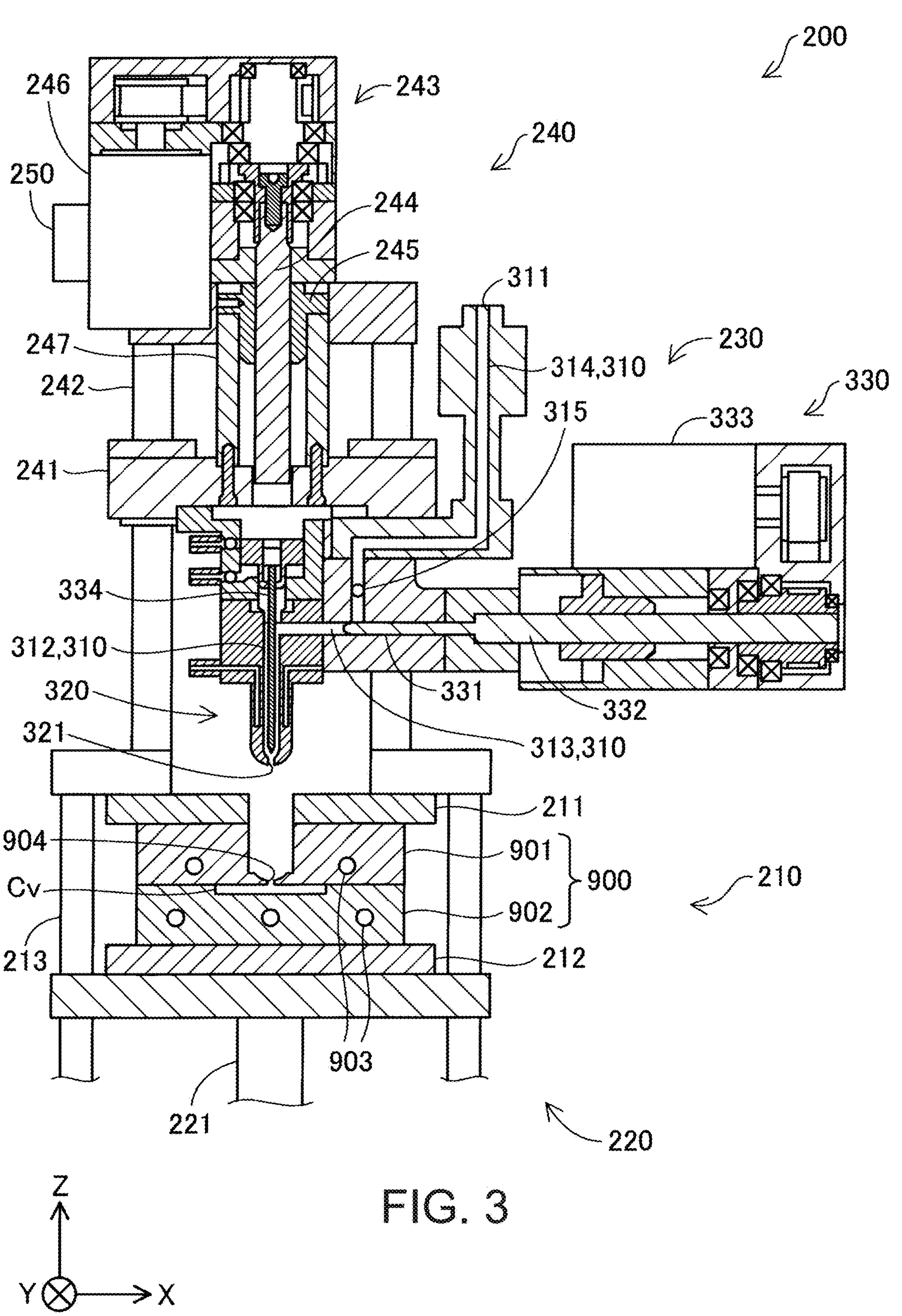
FIG. 3 is a view showing a schematic configuration of an injection unit.

FIG. 3 is a view showing a schematic configuration of the injection unit 200. The injection unit 200 injects the molding material supplied from the pump unit 100 into the molding die 900 to mold a molded article. The injection unit 200 includes a fixing section 210, a mold die clamping section 220, an injection section 230, a moving section 240, and a detection section 250.

A molding die 900 is mounted on the fixing section 210. The fixing section 210 includes a fixed plate 211 and a movable plate 212. The fixed plate 211 and the movable plate 212 are plate-shaped members. The fixed plate 211 is fixed to the upper end side of the tie bars 213 extending in the vertical direction so that the plate surface thereof is parallel to the horizontal direction. The movable plate 212 is disposed below the fixed plate 211 so as to be opposed to the fixed plate 211 so that the plate surface thereof is parallel to the horizontal direction. A fixed molding die 901 of the molding die 900 is mounted on the fixed plate 211, and a movable molding die 902 of the molding die 900 is mounted on the movable plate 212. The fixed molding die 901 and the movable molding die 902 are mounted on the fixed plate 211 and the movable plate 212, respectively, by bolts or a clamping mechanism.

The mold die clamping section 220 opens and closes the molding die 900 mounted on the fixing section 210. The mold die clamping section 220 rotates the ball screw 221 by driving a motor (not shown) under the control of the control section 500, and moving the movable plate 212 coupled to the ball screw 221 along the tie bars 213. The molding die 900 mounted on the fixing section 210 is opened and closed by the movable plate 212 moving along the tie bars 213. The molding die 900 is clamped by the movable plate 212 moving in the +Z direction, and the molding die 900 is opened by the movable plate 212 moving in the −Z direction. When the molding die 900 is subjected to molding die clamping, a cavity Cv is defined by the fixed molding die 901 and the movable molding die 902. The cavity Cv is a space having a shape corresponding to the shape of the molded article.

In the present embodiment, the molding die 900 has a heater 903 for heating the molding die 900 to cure the molding material filled in the cavity Cv. The temperature of heater 903 is controlled by control section 500. The molding die 900 may be made of metal, resin, or ceramic. The molding die 900 made of metal is also referred to as a metal die.

Figure 4:
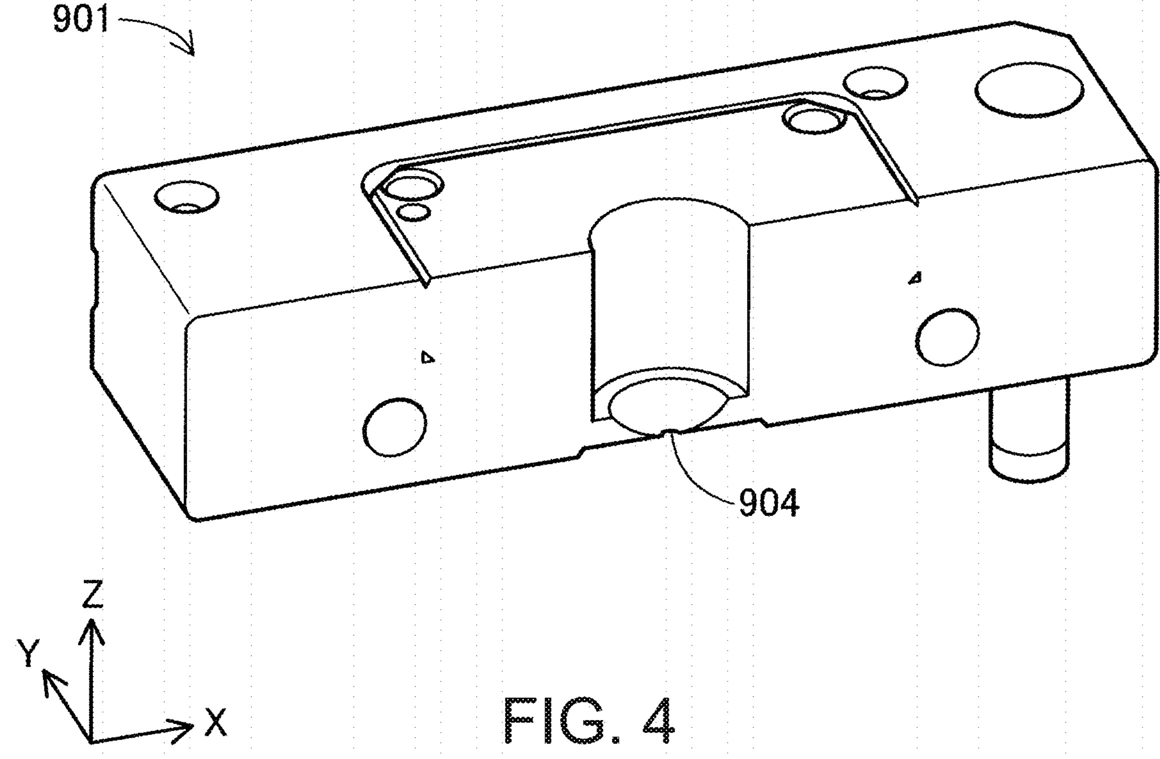
FIG. 4 is a perspective view of a portion of a fixed molding die cut in a plane parallel to X and Z directions.

FIG. 4 is a perspective view of a portion of the fixed molding die 901 cut in a plane parallel to the X and Z directions. A gate opening 904, which is a hole penetrating the fixed molding die 901 in the vertical direction, is formed in the fixed molding die 901. The molding material is filled into the cavity Cv through the gate opening 904. The fixed molding die 901 is mounted on the fixing section 210 so that the gate opening 904 faces the nozzle opening 321 of the nozzle 320 (to be described later) in the vertical direction.

The injection section 230 shown in FIG. 3 injects the molding material supplied from the pump unit 100. The injection section 230 is provided above the fixing section 210 and the mold die clamping section 220. The injection section 230 is provided so as to be movable in the vertical direction along a guide member 242 (to be described later). The injection section 230 includes a flow path 310, a nozzle 320, and an injection amount adjustment mechanism 330.

The flow path 310 brings a material feed port 311, to which the third pipe 135 of the pump unit 100 is connected, and a nozzle opening 321 (to be described later) into communication. The molding material supplied from the pump unit 100 flows into the flow path 310 through the material feed port 311.

A nozzle opening 321 is formed at the distal end of the nozzle 320. The nozzle 320 ejects the molding material in the flow path 310 from the nozzle opening 321.

The flow path 310 includes a first flow path 312, a second flow path 313, and a third flow path 314. The first flow path 312, the second flow path 313, and the third flow path 314 are connected in series in the stated order. The first flow path 312 is a portion of the flow path 310 extending in the +Z direction from the nozzle opening 321. In other words, the first flow path 312 extends in a direction along the vertical direction. Hereinafter, the direction along the vertical direction is also referred to as a first direction. The second flow path 313 is a portion of the flow path 310 extending in a direction intersecting the first direction from an end portion of the first flow path 312 on the +Z direction side. Hereinafter, a direction intersecting the first direction is also referred to as a second direction. In the present embodiment, the second flow path 313 extends in the +X direction from the end portion of the first flow path 312 on the +Z direction side. The third flow path 314 is a portion of the flow path 310 that connects the second flow path 313 and the material feed port 311 to each other.

The injection amount adjustment mechanism 330 adjusts the injection amount of the molding material from the nozzle opening 321. The injection amount adjustment mechanism 330 includes an injection cylinder 331, a plunger 332, a plunger drive section 333, and a shutoff pin 334.

The injection cylinder 331 is a substantially cylindrical member connected to a portion of the flow path 310 where the second flow path 313 and the third flow path 314 connect. The injection cylinder 331 is connected to the flow path 310 so that the axis of the injection cylinder 331 coincides with the axis of the second flow path 313. In the flow path 310, a check-valve 315 is provided on the upstream side of a portion to which the injection cylinder 331 is connected. The check-valve 315 prevents backflow of the molding material from the nozzle opening 321 side to the material feed port 311 side.

The plunger 332 is provided inside the injection cylinder 331. The plunger 332 is provided so as to be movable in the injection cylinder 331 and the second flow path 313 along the second direction. The plunger 332 is driven by the plunger drive section 333 under the control of the control section 500. The plunger drive section 333 is, for example, a motor. The plunger 332 retracts within the injection cylinder 331 and the second flow path 313 in a direction away from the first flow path 312 to suck and meter the molding material into the injection cylinder 331. The plunger 332 advances in the injection cylinder 331 and the second flow path 313 in a direction approaching the first flow path 312, and feeds the sucked molding material into the first flow path 312.

The shutoff pin 334 is inserted into the first flow path 312 from an end portion of the first flow path 312 on a side opposite to the nozzle opening 321. The shutoff pin 334 is a cylindrical member having a diameter smaller than the diameter of the first flow path 312, and is provided so as to be movable along the first direction in the first flow path 312. In other words, the shutoff pin 334 is provided so as to be movable along the direction in which the molding material flows in the flow path 310. The shutoff pin 334 is driven by a shutoff pin driving unit (not shown) under the control of the control section 500. The shutoff pin drive unit has, for example, an air cylinder, and moves the shutoff pin 334 in the first flow path 312 using compressed air. When the shutoff pin 334 moves in the −Z direction inside the first flow path 312, the nozzle opening 321 is closed by the end portion of the shutoff pin 334 on the nozzle opening 321 side, and the injection of the molding material from the nozzle opening 321 is stopped. When the shutoff pin 334 moves in the +Z direction inside the first flow path 312, the nozzle opening 321 is opened, and the molding material is ejected from the nozzle opening 321.

Figure 5:
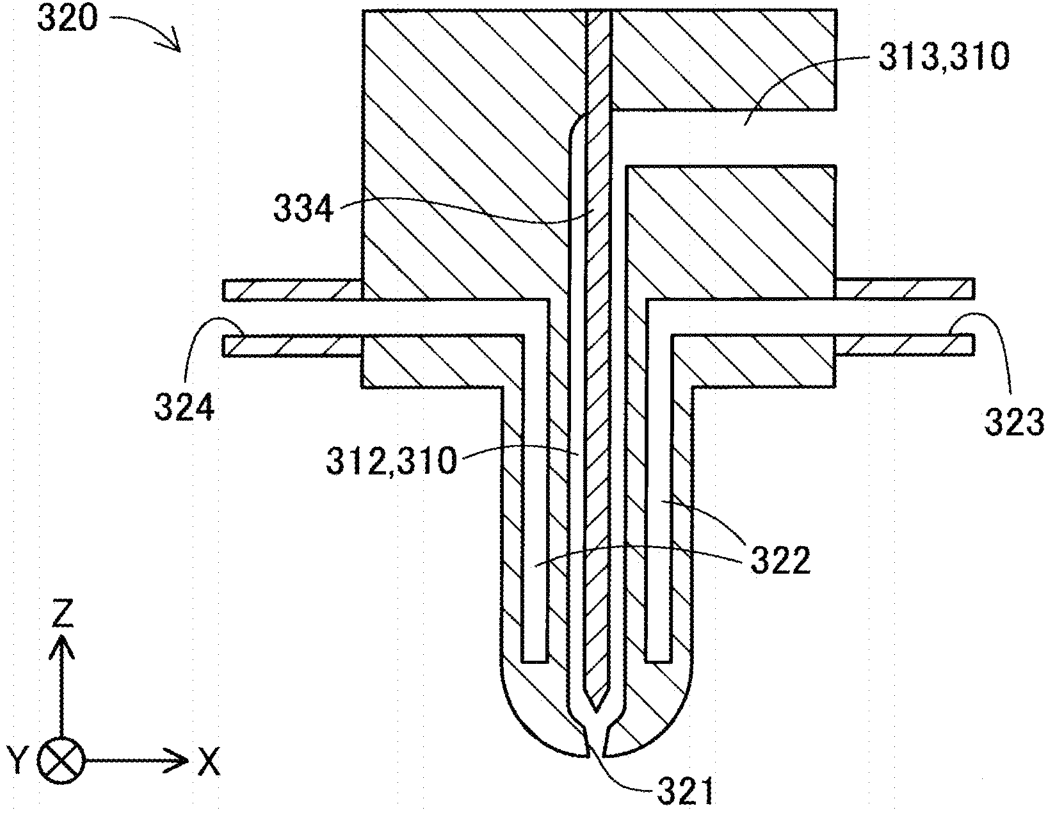
FIG. 5 is an enlarged view of a nozzle shown in FIG. 3.

FIG. 5 is an enlarged view of the nozzle 320 shown in FIG. 3. As shown in FIG. 5, the end portion of the shutoff pin 334 on the side of the nozzle opening 321 side is configured to have a protruding shape that does not have a flat surface. The end portion of the shutoff pin 334 on the nozzle opening 321 side has a pointed shape in the direction in which the molding material flows in the first flow path 312 when the molding material is ejected from the nozzle opening 321. In the present embodiment, the end portion of the shutoff pin 334 on the nozzle opening 321 side has a pointed shape in the −Z direction.

As shown in FIG. 5, the nozzle 320 has a refrigerant flow passage 322 through which the refrigerant flows. The refrigerant is, for example, water. The refrigerant flow passage 322 is provided in the vicinity of the first flow path 312 so that the molding material in the first flow path 312 is cooled by the refrigerant flowing therein. The refrigerant flow passage 322 communicates a refrigerant introduction port 323 provided on an outer surface of the nozzle 320 with a refrigerant discharge port 324. The refrigerant introduced into the refrigerant flow passage 322 from the refrigerant introduction port 323 is discharged from the refrigerant discharge port 324. The refrigerant discharged from the refrigerant discharge port 324 is cooled by, for example, a chiller, and is circulated to the refrigerant introduction port 323.

The moving section 240 shown in FIG. 3 is provided above the injection section 230. The moving section 240 moves the injection section 230 relative to the fixed molding die 901 fixed to the fixing section 210. The moving section 240 includes a movable member 241, a guide member 242, a base section 243, a screw shaft 244, a ball nut 245, and a moving motor 246. The ball screw configured to the screw shaft 244 and the ball nut 245.

Figure 6:
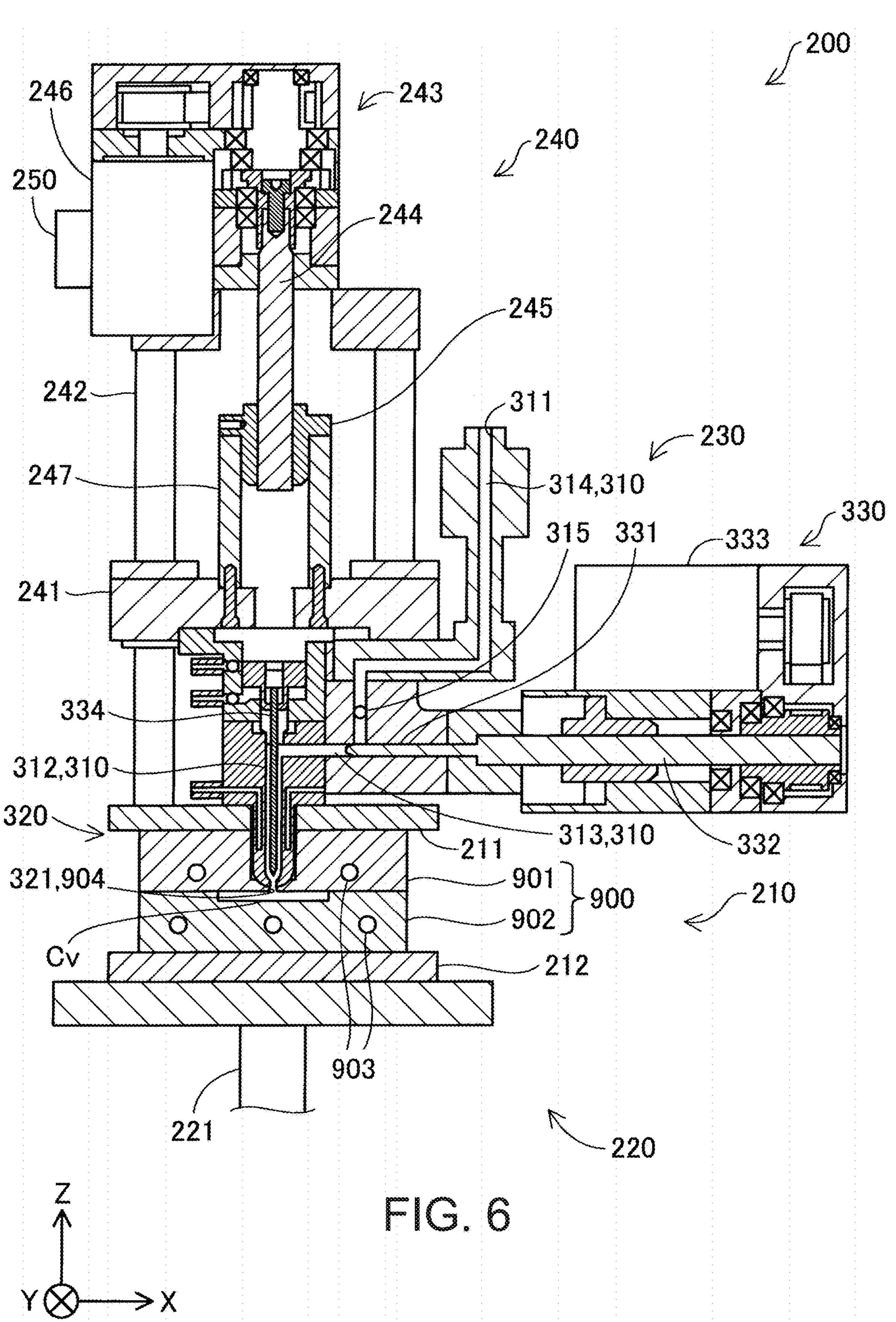
FIG. 6 is a view showing a state in which an injection section is moved to a position where the nozzle and the fixed molding die come into contact with each other.

An injection section 230 is fixed to the movable member 241. The movable member 241 is attached to a guide member 242 so as to be movable along the guide member 242 which is a columnar member extending vertically upward from the upper portion of the fixing section 210. The base section 243 is fixed to the upper end of the guide member 242. The screw shaft 244 is fixed to the base section 243 so as to project downward from the base section 243. The axial direction of the screw shaft 244 is a direction along the vertical direction. The ball nut 245 is attached to the screw shaft 244, and is fixed to the connecting member 247 fixed to the movable member 241. The moving motor 246 is driven under the control of the control section 500 and rotates the screw shaft 244 around the axial line. When the screw shaft 244 rotates, the ball nut 245, the connecting member 247, and the movable member 241 are moved in the vertical direction, and accordingly, the injection section 230 moves in the vertical direction. When the injection section 230 moves in the −Z direction, the nozzle 320 contacts the fixed molding die 901 so that the nozzle opening 321 and the gate opening 904 communicate with each other. When the injection section 230 moves in the +Z direction, the nozzle 320 separates from the fixed molding die 901. FIG. 6 is view showing a state in which the injection section 230 is moved to a position where the nozzle 320 and the fixed molding die 901 contact each other.

The detection section 250 detects the contact pressure between the nozzle 320 and the fixed molding die 901. The detection section 250 detects the contact pressure between the nozzle 320 and the fixed molding die 901 by measuring the torque of the moving motor 246, for example.

Figure 7:
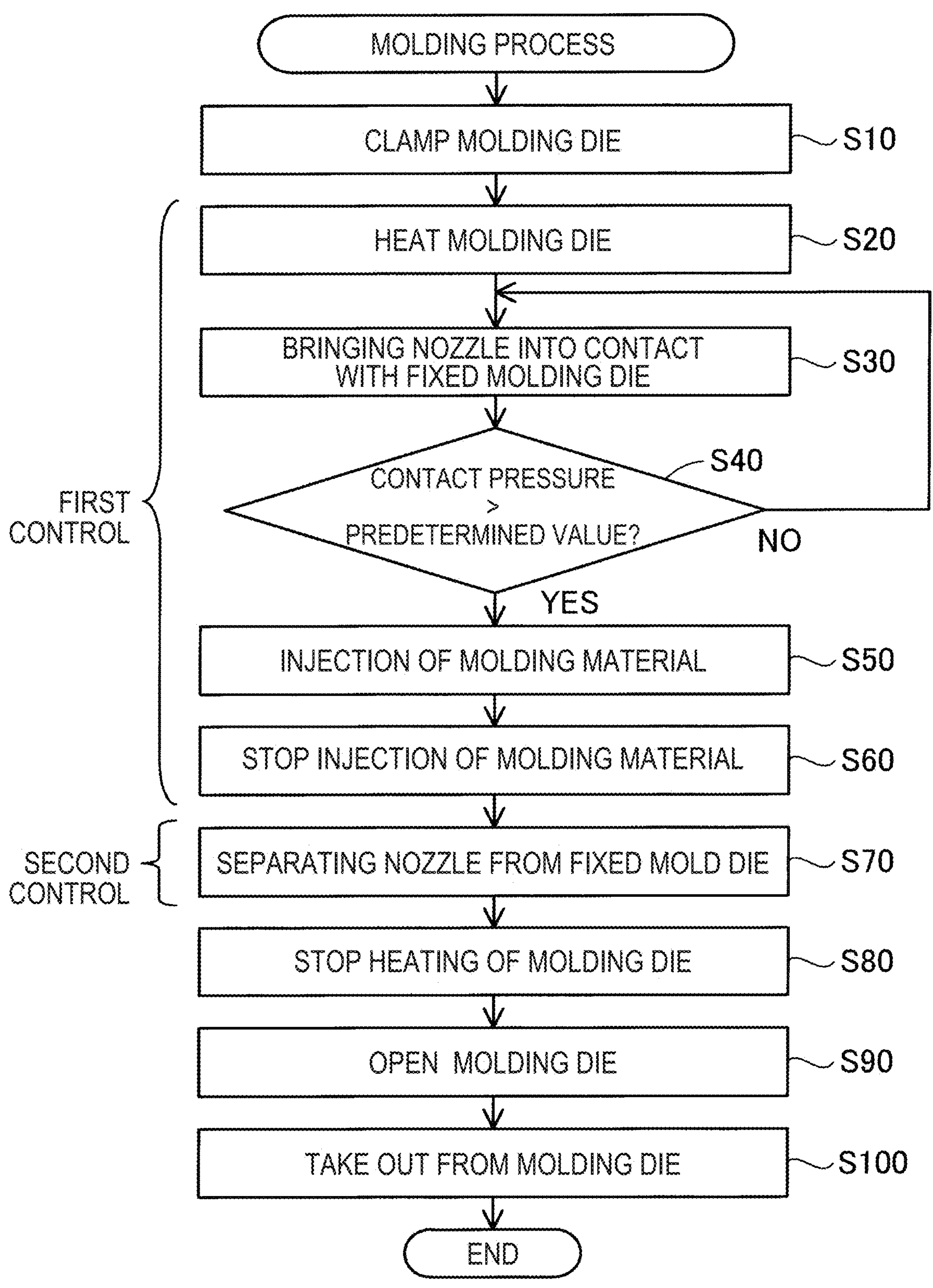
FIG. 7 is a process chart of a molding process executed by the injection molding device.

FIG. 7 is a process chart of a molding process executed by the injection molding device 10. The molding process is a process of molding a molded article by injecting a molding material into the cavity Cv of the molding die 900.

In step S10, the control section 500 controls the mold die clamping section 220 to perform molding die clamping on the molding die 900 mounted on the fixing section 210.

In step S20, the control section 500 heats the molding die 900 by controlling the temperature of the heater 903.

In step S30, the control section 500 controls the moving section 240 to move the injection section 230 in the −Z direction to bring the nozzle 320 into contact with the fixed molding die 901. In other words, the control section 500 presses the nozzle 320 against the fixed molding die 901.

In step S40, the control section 500 determines whether the contact pressure detected by the detection section 250 is equal to or greater than a predetermined value. If the contact pressure is equal to or greater than the predetermined value, step S50 is performed. If the contact pressure is less than the predetermined value, the control section 500 returns the process to step S30. If the contact pressure does not become equal to or greater than a predetermined value even when a predetermined period of time has elapsed after the nozzle 320 and the fixed molding die 901 came into contact with each other, the control section 500 interrupts the execution of a first control (to be described later). Further, the notification unit (not shown) may notify that the contact pressure does not become equal to or greater than the predetermined value or that the first control is interrupted.

In step S50, the control section 500 controls the injection amount adjustment mechanism 330 to inject the molding material from the nozzle opening 321 into the cavity Cv of the molding die 900 through the gate opening 904. First, the control section 500 moves the shutoff pin 334 in the +Z direction in the first flow path 312 to open the nozzle opening 321. After moving the shutoff pin 334, the control section 500 moves the plunger 332 forward in the injection cylinder 331 and the second flow path 313.

In step S60, the control section 500 controls the injection amount adjustment mechanism 330 to stop the injection of the molding material from the nozzle opening 321. First, the control section 500 moves the shutoff pin 334 in the −Z direction in the first flow path 312 to close the nozzle opening 321. After moving the shutoff pin 334, the control section 500 retracts the plunger 332 in the second flow path 313 and the injection cylinder 331. Step S60 is executed when a predetermined amount of molding material is injected into the cavity Cv and the cavity Cv is filled with molding material. The processes from step S20 to step S60 are also referred to as a first control.

In step S70, the control section 500 controls the moving section 240 to move the injection section 230 in the +Z direction and separate the nozzle 320 from the fixed molding die 901. The control section 500 separates the nozzle 320 from the fixed molding die 901 at a speed higher than the speed of the nozzle 320 when the nozzle 320 came into contact with the fixed molding die 901 in step S30. Step S70 is executed after the elapse of a predetermined time from when step S60 was executed. The predetermined time is set by the user based on the thermosetting time of the thermosetting material contained in the molding material. For example, when the molding material is silicone, the predetermined time is preferably about 30 seconds to 50 seconds. Step S70 is also referred to as a second control. In other words, the second control is executed after the elapse of a predetermined time from the completion of the first control.

In step S80, the control section 500 stops the heating of the molding die 900 by controlling the temperature of the heater 903. Step S80 is executed after the elapse of a predetermined time from when step S70 was executed. For example, when the molding material is silicone, the predetermined time is preferably about 50 seconds to 60 seconds.

In step S90, the control section 500 controls the mold die clamping section 220 to perform molding die opening of the molding die 900. In other words, the control section 500 separates the movable molding die 902 from the fixed molding die 901. The speed at which the movable molding die 902 is separated from the fixed molding die 901 is preferably equal to or less than 5 mm per second.

In step S100, a molded article is taken out from the molding die 900. When the molding die 900 is opened, the molded article moves downward together with the movable molding die 902. The molded article is separated from the movable molding die 902 by ejector pins, which are embedded in the movable molding die 902, moving in the +Z direction. As described above, the molding process is executed.

According to the injection molding device 10 in the first embodiment described above, since the nozzle 320 is separated from the fixed molding die 901 after elapse of a predetermined time from the completion of the injection of the molding material in the cavity Cv, at least a part of the molding material in the vicinity of the gate opening 904 is cured before the nozzle 320 is separated from the fixed molding die 901. Therefore, it is possible to reduce the possibility that the uncured molding material is attached to the nozzle 320 and forms strings when the nozzle 320 is separated from the fixed molding die 901.

In the present embodiment, the time from the completion of the injection of the molding material into the cavity Cv to the separation of the nozzle 320 from the fixed molding die 901 is set by the user based on the thermal curing time of the thermosetting material contained in the molding material. Therefore, the user can set an appropriate time in accordance with the type of the thermosetting material used for molding the molded article.

In the present embodiment, the control section 500 presses the nozzle 320 against the fixed molding die 901 until the contact pressure between the nozzle 320 and the fixed molding die 901 detected by the detection section 250 is equal to or greater than a predetermined value. Therefore, it is possible to suppress a situation in which the molding material is ejected from the nozzle 320 in a state in which the contact pressure between the nozzle 320 and the fixed molding die 901 is insufficient, which would result in the cavity Cv not being filled with the molding material in an amount necessary for molding the molded article.

In the present embodiment, the control section 500 interrupts the execution of the first control if, even after elapse of the predetermined time from when the nozzle 320 and the fixed molding die 901 came into contact, the contact pressure does not become equal to or greater than a predetermined value. Therefore, it is possible to suppress the molding material from being ejected from the nozzle 320 in a state where the contact pressure between the nozzle 320 and the fixed molding die 901 is insufficient.

In the present embodiment, after the injection of the molding material into the cavity Cv is completed, the control section 500 separates the nozzle 320 from the molding die 900 at a speed higher than the speed at which the nozzle 320 is brought into contact with the molding die 900. Therefore, when the nozzle 320 is separated from the molding die 900, the molding material can be made less likely to adhere to the nozzle 320.

Figure 8:
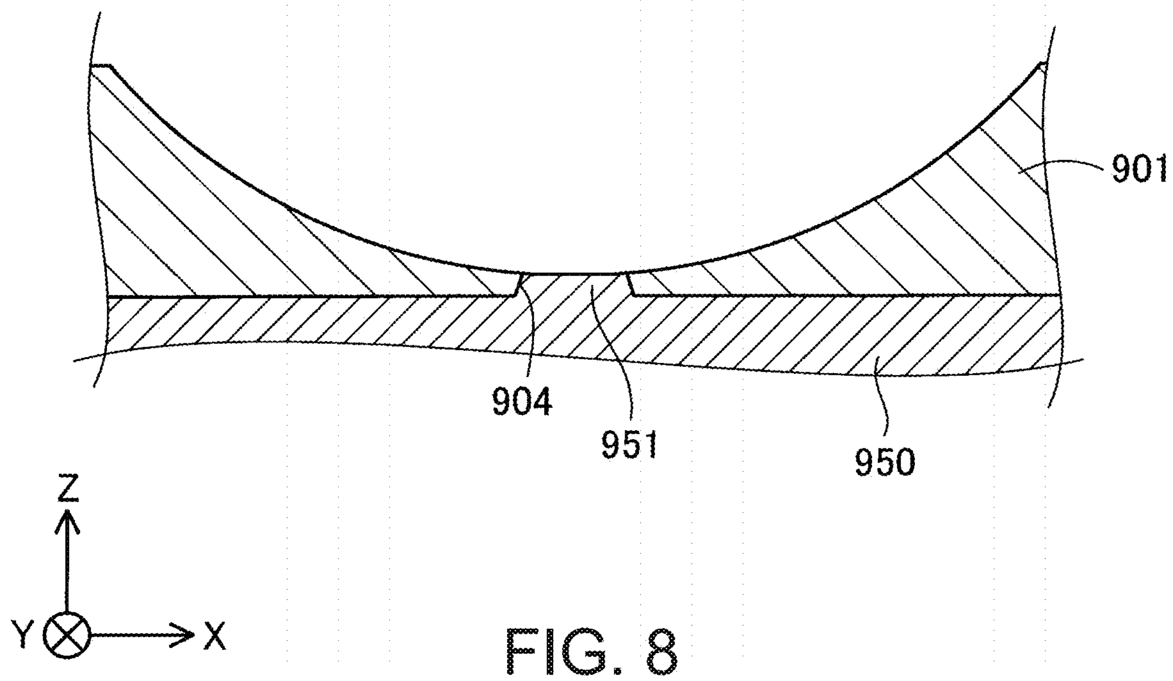
FIG. 8 is a view showing the fixed molding die in the vicinity of a gate opening in a state where a cavity is filled with molding material.

In the present embodiment, the speed at which the movable molding die 902 is separated from the fixed molding die 901 is preferably equal to or less than 5 mm per second. FIG. 8 shows a cross-sectional view of the fixed molding die 901 in the vicinity of the gate opening 904 in a state where the cavity Cv is filled with the molding material 950. The molding material 950 shown in FIG. 8 is cured. When the cavity Cv is filled with the molding material 950, a runner section 951 is formed in the vicinity of the gate opening 904. When the speed at which the movable molding die 902 is separated from the fixed molding die 901 is high, the runner section 951 is less likely to detach from the fixed molding die 901, and the molded article is likely to remain attached to the fixed molding die 901 when the molding die 900 is opened. In the present embodiment, since the movable molding die 902 is separated from the fixed molding die 901 at a speed of equal to or less than 5 mm per second, the runner section 951 can be easily removed from the fixed molding die 901 when the molding die 900 is opened. As a result, the molded article can be easily taken out from the molding die 900.

In the present embodiment, the plunger 332 moves along the second direction in the second flow path 313 extending in the second direction, which is a direction intersecting the vertical direction. Therefore, the size of the injection section 230 in the vertical direction can be reduced as compared with the case where the plunger 332 moves in the direction along the vertical direction. Therefore, the injection molding device 10 can be downsized in the vertical direction.

Figure 9:
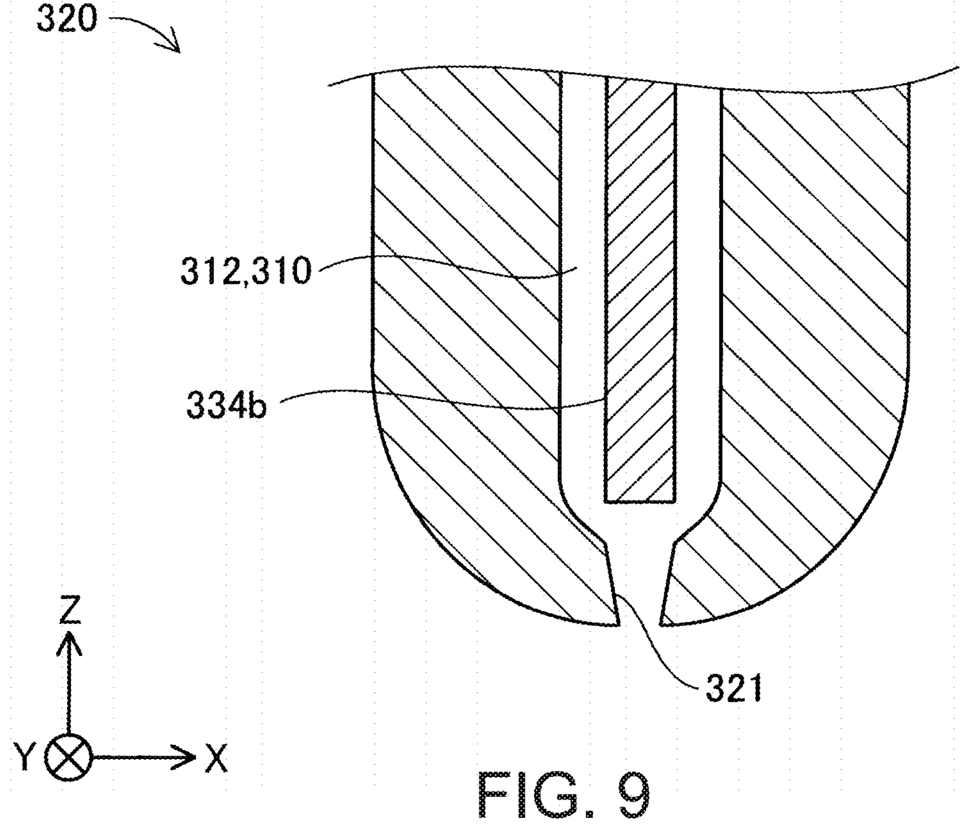
FIG. 9 is a view showing an example of a shutoff pin in which the end portion on the nozzle opening side is a flat surface.

In the present embodiment, the end portion of the shutoff pin 334 on the nozzle opening 321 side has a protruding shape that does not have a flat surface. FIG. 9 shows an example of the shutoff pin 334*b* in which the end portion on the nozzle opening 321 side is a flat surface. When the shutoff pin 334*b* moves in the −Z direction, the molding material located below the shutoff pin 334*b* is pushed out from the nozzle opening 321. As shown in FIG. 5, when the end portion of the shutoff pin 334 has a projection shape, the shutoff pin 334 moves in the −Z direction so as to push aside the molding material positioned below the shutoff pin 334. Therefore, in the present embodiment, when the injection of the molding material from the nozzle opening 321 is stopped by moving the shutoff pin 334 downward, the amount of the molding material extruded from the nozzle opening 321 can be reduced.

In the present embodiment, the heating of the molding die 900 is stopped after the elapse of a predetermined time from when the nozzle 320 separates from the fixed molding die 901. In other words, the nozzle 320 is separated from the fixed molding die 901 before the molding material filled in the cavity Cv is completely cured. Therefore, it is possible to make it difficult to cure the molding material in the flow path as compared with the case where the nozzle 320 is in contact with the fixed molding die 901 until the molding material is completely cured.

In the present embodiment, the nozzle 320 has a refrigerant flow passage 322. Therefore, the molding material in the nozzle 320 is unlikely to cure during the period in which the nozzle 320 and the fixed molding die 901 are in contact with each other.

In the present embodiment, the injection section 230 includes the shutoff pin 334. Therefore, the thickness of the fixed molding die 901 in the vertical direction can be reduced as compared with the case where the shut-off mechanism is provided in the fixed molding die 901.

B. Other Embodiments (B-1) In the above embodiment, the molding die 900 has the heater 903. On the other hand, the fixing section 210 may have a heater for heating the molding die 900.

(B-2) In the above embodiment, the injection unit 200 includes the detection section 250. On the other hand, the injection unit 200 may not include the detection section 250.

(B-3) In the above embodiment, in step S70 of the molding process, the control section 500 separates the nozzle 320 from the fixed molding die 901 at a speed higher than the speed of the nozzle 320 when the nozzle 320 comes into contact with the fixed molding die 901 in step S30. On the other hand, the control section 500 may separate the nozzle 320 from the fixed molding die 901 at the same speed as the speed of the nozzle 320 when the nozzle 320 comes into contact with the fixed molding die 901 in step S30, or at a speed slower than the speed described above.

(B-4) In the above embodiment, the second flow path 313 extends in a direction along the X direction. On the other hand, the direction in which the second flow path 313 extends is not limited to the direction along the X direction. The second flow path 313 may extend in a direction intersecting the vertical direction.

(B-5) In the above embodiment, the end portion of the shutoff pin 334 on the nozzle opening 321 side is in a protruding shape without a flat surface. On the other hand, the end portion of the shutoff pin 334 on the nozzle opening 321 side may not have a protruding shape or may have a flat surface.

C. Other Forms

The present disclosure is not limited to the embodiments described above, and can be realized in various aspects without departing from the scope of the present disclosure. For example, the present disclosure can also be realized by the following aspects. The technical features in the above described embodiments corresponding to the technical features in each aspect described below can be appropriately replaced or combined in order to solve a part or all of the problems of the present disclosure or to achieve a part or all of the effects of the present disclosure. If the technical features are not described as essential in the present specification, the technical features can be appropriately deleted.

(1) According to one aspect of the present disclosure, an injection molding device is provided.

This injection molding device includes a removable fixing section that has a fixed molding die formed with a gate opening and a movable molding die configured for molding die clamping with the fixed molding die, and in which a cavity is defined by the fixed molding die and the movable molding die; an injection section that injects a molding material containing a thermosetting material and a polymerization initiator that initiates a polymerization reaction of the thermosetting material; and a moving section that moves the injection section relative to the fixed molding die mounted on the fixing section, wherein the injection section includes a nozzle having a nozzle opening and that injects the molding material from the nozzle opening, and an injection amount adjustment mechanism that adjusts the injection amount of the molding material from the nozzle opening; at least one of the fixing section and the molding die includes a heater that heats the molding die, the injection molding device further includes a control section configured to control the moving section, the injection amount adjustment mechanism, and the heater, and in a state where the molding die is mounted on the fixing section, the control section that executes a first control of, in a state where the heater is controlled to heat the molding die, controlling the moving section to bring the nozzle into contact with the fixed molding die and controlling the injection amount adjustment mechanism to inject the molding material from the nozzle opening, through the gate opening, and into the cavity and a second control of, after the elapse of a predetermined time from completion of the first control, controlling the moving section to separate the nozzle from the fixed molding die.

According to such an aspect, at least a part of the molding material in the vicinity of the gate opening is cured before the nozzle is separated from the fixed molding die. Therefore, it is possible to reduce the possibility that the molding material adheres to the nozzle and forms strings when the nozzle is separated from the fixed molding die.

(2) The above aspect may further include a detection section that detects a contact pressure between the nozzle and the fixed molding die, wherein in the first control, before the molding material is injected into the cavity, the control section presses the nozzle against the fixed molding die until the contact pressure detected by the detection section becomes equal to or greater than a predetermined value.

According to such an aspect, it is possible to suppress a situation in which the molding material is ejected from the nozzle in a state where the contact pressure between the nozzle and the fixed molding die is insufficient, which could result in the cavity not being filled with molding material in an amount necessary for molding the molded article.

(3) The above aspects may be such that the control section interrupts execution of the first control if the contact pressure does not become equal to or greater than a predetermined value even after the elapse of a predetermined time from when the nozzle and the fixed molding die came into contact with each other.

According to such an aspect, it is possible to suppress the injection of the molding material from the nozzle in a state where the contact pressure between the nozzle and the fixed molding die is insufficient.

(4) The above aspects may be such that in the second control, the control section separates the nozzle from the fixed molding die at a speed higher than the speed at which the nozzle is brought into contact with the fixed molding die in the first control.

According to such an aspect, in a case where the nozzle is separated from the fixed molding die, it is possible to reduce the possibility that the molding material attaches to the nozzle and forms strings.

(5) The above aspects may be such that after executing the second control, the control section separates the movable molding die from the fixed molding die at a speed of equal to or less than 5 mm per second.

According to such an aspect, in a case where the movable molding die is separated from the fixed molding die, the molded article can be easily removed from the fixed molding die.

(6) The above aspects may be such that the injection section includes a flow path through which the molding material flows, the flow path includes a first flow path extending in a first direction, which is a direction along the vertical direction and a second flow path extending in a second direction, which intersects the first direction, and the injection amount adjustment mechanism includes a shutoff pin that moves in the first flow path along the first direction and a plunger that moves in the second flow path along the second direction.

According to such an aspect, it is possible to miniaturize the injection molding device in the vertical direction compared to a case where the plunger moves in a direction along the vertical direction.

(7) The above aspects may be such that the injection amount adjustment mechanism includes a shutoff pin that moves along a direction in which the molding material flows inside a flow path through which the molding material flows and an end portion of the shutoff pin on the nozzle opening side is a protruding shape without a flat surface.

According to such an aspect, compared to a case where the end portion of the shutoff pin on the nozzle opening side is a flat surface, it is possible to reduce the amount of the molding material extruded from the nozzle opening when the shutoff pin is moved in a direction approaching the nozzle opening.

What is claimed is:

1. An injection molding device comprising:

a base to which a fixed molding die and a movable molding die are fixed, the fixed molding die having a gate opening, the movable molding die being configured to be clamped with the fixed molding die during molding, a cavity being defined by the fixed molding die and the movable molding die;

a heater included in at least one of the base and the fixed and movable molding dies;

an injection head configured to inject a molding material into the cavity via the gate opening of the fixed molding die, the molding material containing a thermosetting material and a polymerization initiator that initiates a polymerization reaction of the thermosetting material; the injection head including:

a nozzle having a nozzle opening, the molding material being injected into the cavity from the nozzle via the nozzle opening and the gate opening of the fixed molding die; and an injection amount adjustment mechanism configured with an injection cylinder, a plunger, and a first motor, the injection amount adjustment mechanism being configured to adjust an injection amount of the molding material from the nozzle;

a second motor configured to move the injection head relative to the fixed molding die mounted on the base;

a contact pressure detector configured to detect a contact pressure between the nozzle and the fixed molding die by measuring a torque of the second motor;

a memory configured to store a program; and a processor configured to execute the program so as to:

cause the heater to heat the at least one of the base and the fixed and movable molding dies;

cause, while heating by the heater, the second motor to move the injection head to the fixed molding die such that the gate opening of the fixed molding die is aligned with the nozzle opening;

cause, while heating by the heater, the contact pressure detector to detect a contact pressure value while aligning between the gate opening of the fixed molding die and the nozzle opening;

determine, while heating by the heater, whether the contact pressure value is equal to or more than a first predetermined value;

control, while heating by the heater, the injection amount adjustment mechanism to inject the molding material into the cavity when the processor determines that the contact pressure value is equal to or more than the first predetermined value;

control, while heating by the heater, the injection amount adjustment mechanism to stop injecting the molding material into the cavity after the molding material is injected into the cavity;

cause, while heating by the heater, the second motor to move the injection head away from the fixed molding die after a first predetermined time has elapsed from the stop of injecting the molding material; and cause the heater to stop heating the at least one of the base and the fixed and movable molding dies after a second predetermined time has elapsed from a state in which the injection head has moved away from the fixed molding die.

2. The injection molding device according to claim 1, wherein the processor is further configured to control, while heating by the heater, the injection amount adjustment mechanism not to inject the molding material into the cavity when the processor determines that the contact pressure value is less than the first predetermined value.

3. The injection molding device according to claim 1, wherein the processor is further configured to:

control the second motor to move the injection head to the fixed molding die at a first speed such that the gate opening of the fixed molding die is aligned with the nozzle opening; and control the second motor to move the injection head away from the fixed molding die at a second speed after the first predetermined time has elapsed from the stop of injecting the molding material, and the second speed is higher than the first speed.

4. The injection molding device according to claim 1, further comprising:

a third motor configured to clamp the movable molding die with the fixed molding die, wherein after the second motor moves the injection head away from the fixed molding die, the processor is further configured to control the third motor to move the movable molding die from the fixed molding die at a third speed of equal to or less than 5 mm per second.

5. The injection molding device according to claim 1, wherein the injection head includes a flow path through which the molding material flows along a first direction, the flow path includes;

a first flow path extending along the first direction; and a second flow path extending in a second direction intersecting the first direction, the injection amount adjustment mechanism further includes a shutoff pin that moves in the first flow path along the first direction, and the plunger of the injection amount adjustment mechanism moves in the second flow path along the second direction.

6. The injection molding device according to claim 1, wherein the injection amount adjustment mechanism includes a shutoff pin that moves along a direction in which the molding material flows inside a flow path through which the molding material flows, and an end portion of the shutoff pin on a side of the nozzle opening is a protruding shape without a flat surface.

* * * * *